(12) United States Patent
Blakborn (10) Patent No.: US 10,804,669 B2
(45) Date of Patent: Oct. 13, 2020

(54) ASSEMBLY METHOD FOR A CONNECTOR

(71) Applicant: Rosenberger Hochfrequenztechnik GmbH & Co. KG, Fridolfing (DE)

(72) Inventor: Willem Blakborn, Inzell (DE)

(73) Assignee: ROSENBERGER HOCHFREQUENZTECHNIK GMBH, Fridolfing (DE)

( * ) Notice: Subject to any disclaimer, the term of this patent is extended or adjusted under 35 U.S.C. 154(b) by 0 days.

(21) Appl. No.: 16/342,796

(22) PCT Filed: Aug. 25, 2017

(86) PCT No.: PCT/EP2017/071403
§ 371 (c)(1),
(2) Date: Apr. 17, 2019

(87) PCT Pub. No.: WO2018/077509
PCT Pub. Date: May 3, 2018

(65) Prior Publication Data
US 2020/0052452 A1 Feb. 13, 2020

(30) Foreign Application Priority Data
Oct. 26, 2016 (EP) .................................. 16195772

(51) Int. Cl.
*H01R 43/20* (2006.01)
*F16B 5/02* (2006.01)
(Continued)

(52) U.S. Cl.
CPC .............. *H01R 43/20* (2013.01); *F16B 5/02* (2013.01); *F16B 35/045* (2013.01); *H01R 4/34* (2013.01);
(Continued)

(58) Field of Classification Search
CPC ........ H01R 25/145; H01R 13/53; H01R 9/18; H01R 4/34; H01R 43/20; H01R 4/305; H01R 4/30; F16B 35/045; F16B 35/02
(Continued)

(56) References Cited

U.S. PATENT DOCUMENTS 3,424,212 A * 1/1969 Kemper ................ B25B 15/007
81/436
4,822,291 A 4/1989 Cunningham
(Continued)

FOREIGN PATENT DOCUMENTS

CN 1762076 A 4/2006
CN 202662839 U 1/2013
(Continued)

OTHER PUBLICATIONS

FR 3054801 Machine Translation.*
JP-2007258105-A Machine Translation.*

*Primary Examiner* — Nguyen Tran
*Assistant Examiner* — Paul D Baillargeon
(74) *Attorney, Agent, or Firm* — David P. Dickerson (57) ABSTRACT

The present invention relates to an assembly method for a connector, in particular for a high-voltage connector, having an electrical conductor and an electric contact, which assembly method comprises the following steps: providing a screw having a first drive and a second drive which is formed opposite the first drive; establishing a connection with play between the electrical conductor and the electric contact by means of the screw by the screw being inserted respectively into a passage hole in the electrical conductor and in the electric contact and being turned in a first direction by way of its first drive; tightening the connection between the electrical conductor and the electric contact by the screw being turned in a second direction, which is opposite the first
(Continued)

direction, by way of its second drive. The present invention further relates to a connector and also to a screw.

20 Claims, 5 Drawing Sheets

(51) Int. Cl.
*F16B 35/04* (2006.01)
*H01R 4/34* (2006.01)
*H01R 9/18* (2006.01)
*H01R 13/53* (2006.01)
*H01R 25/14* (2006.01)

(52) U.S. Cl.
CPC ............ *H01R 9/18* (2013.01); *H01R 13/53* (2013.01); *H01R 25/145* (2013.01)

(58) Field of Classification Search
USPC .......................................................... 411/410
See application file for complete search history.

(56) References Cited

U.S. PATENT DOCUMENTS

| | | | |
|---|---|---|---|
| 5,645,457 A | | 7/1997 | Hirayama |
| 6,053,780 A | * | 4/2000 | Ono ..................... H01R 4/34 439/810 |
| 2013/0280965 A1 | * | 10/2013 | Kojyo ................... H01R 9/18 439/722 |

FOREIGN PATENT DOCUMENTS

| | | | | |
|---|---|---|---|---|
| CN | 105576434 A | | 5/2016 | |
| DE | 102011004347 A1 | | 8/2012 | |
| DE | 202012011985 A1 | | 2/2013 | |
| EP | 2653735 A2 | | 10/2013 | |
| EP | 2676334 B1 | | 8/2015 | |
| FR | 3054801 A1 | * | 2/2018 | ........... F16B 35/045 |
| JP | 2007258105 A | * | 10/2007 | |
| JP | 2013225378 A | | 10/2013 | |
| WO | 2011061074 A1 | | 5/2011 | |
| WO | 2016038814 A1 | | 3/2016 | |

* cited by examiner

ASSEMBLY METHOD FOR A CONNECTOR

FIELD OF THE INVENTION

The present invention relates to an electrical connector and to an electrical connector assembly method.

TECHNICAL BACKGROUND

DE 10 2011 004 347 A1 describes a connector having an electrical line and electric contacts. In order to assemble the connector, the individual parts of said connector are put together and fastened to one another, for example by means of pressing, screwing or the like.

Manufacturing tolerances have to be taken into account during assembly. Tolerance compensation after the assembly is completed is no longer possible.

This is a state for which improvement is sought.

SUMMARY OF THE INVENTION

In light of this background, an object of the present invention is to specify an assembly method for a connector, which assembly method has improved tolerance compensation.

Inter alia, the present disclosure teaches:
an assembly method for a connector, in particular for a high-voltage connector, having an electrical conductor and an electric contact, which assembly method comprises the following steps: providing a screw having a first drive and a second drive which is formed opposite the first drive; establishing a connection with play between the electrical conductor and the electric contact by means of the screw by the screw being inserted respectively into a passage hole in the electrical conductor and in the electric contact and being turned in a first direction by way of its first drive; tightening the connection between the electrical conductor and the electric contact by the screw being turned in a second direction, which is opposite the first direction, by way of its second drive;
a connector which has an electrical conductor, an electric contact and a screw, wherein the screw is inserted respectively into a passage hole in the electrical conductor and in the electric contact and has a first drive on a screw head and a second drive on a screw foot which is situated opposite the screw head; and
a screw for establishing a high-voltage connection, which screw has a screw head having a first drive, a screw foot which is situated opposite the screw head and has a second drive, and a thread which is formed between the screw head and the screw foot.

The present invention is based, inter alia, on the idea of preassembling individual parts of a connector in such a way that they are fastened to one another with play. The preassembled individual parts of the connector are referred to below as "assembly". After the assembly has been preassembled, it can be installed in a component. The objective is that as low as possible a number of process steps is required for final assembly of the assembly in the component.

The present invention allows final assembly of the component or virtually final assembly in which the preassembled assembly is inserted. Owing to the play of the individual parts of the connector of the assembly, said assembly is suitable for compensating for manufacturing tolerances of the component. However, after assembly of the assembly in the component, it may be that the assembly is no longer accessible at conventional final assembly points. The present invention therefore provides final assembly of the assembly in the component by means of further assembly points which are accessible until the connector is concealed in the component.

The present invention allows, in particular, the assembly to be assembled by a first manufacturer, for example a supplier, and delivered to a second manufacturer for further processing. The second manufacturer can then insert the preassembled assembly in components produced by them and finally assemble the connector in the component.

It is evident that the features cited above and those still to be explained below can be used not only in the respectively specified combination but also in other combinations or on their own, without departing from the scope of the present invention.

According to one preferred embodiment of the invention, the preassembled assembly is inserted into a connector housing by way of the screw and by way of the electric contact. Typically, the electrical conductor is also fastened to the electric contact by means of the screw. However, the electrical conductor is generally not inserted into the connector housing, but rather is routed from outside the connector housing to the electric contact.

In this way, assembly of the connector is already far advanced before assembly in a component and the assembly is already protected by the housing before assembly in the component.

According to one preferred embodiment of the invention, the assembly method additionally comprises fastening the connector in a component such that the screw can be turned solely by means of the second drive. In this way, the invention has a particularly advantageous effect. Therefore, the connector can also be installed in the component in a largely inaccessible manner.

In this way, assembly of the connector in the component can be completed since the component is already virtually completely assembled. This allows improved tolerance compensation of manufacturing tolerances of the connector and of the component.

According to one preferred embodiment of the invention, the connector is axially centered in the component by means of a centering aid. In this way, mechanical loads on the preassembled assembly or connector are intended to be reduced. In particular, the play between the individual parts of the preassembled assembly can lead to mechanical loads or to tilting of the assembly in the component. Mechanical loads have a disadvantageous effect on the electrical properties of the connector.

The centering aid is designed to move the connection to its end position immediately after preassembly.

According to one preferred embodiment of the invention, a screw is provided, the first drive of said screw being formed in a screw head and the second drive of said screw being formed in a screw foot. This configuration of the screw has proven particularly expedient, although the second drive of the screw can also be formed, for example, on a bottom side of the screw head.

According to one preferred embodiment of the invention, a protective cap is fitted on the connector housing before the connection is tightened. The protective cap is designed in such a way that it does not cover the second drive of the screw and at least partially protects the connector, for example against being scratched by a tool. In this way, a coding for assembly of the connector in the component can be provided at the same time.

According to one preferred embodiment, the invention comprises tightening the connection via an access point to an interface, in particular a socket. In this way, final assembly of the connector in the component can be ensured when the connector is only partially accessible to a tool. The access point via the socket is particularly expedient since the socket, until the connector is concealed, has to remain free and accessible in any case, and the connector is generally not concealed before assembly is complete.

According to one preferred embodiment of the method according to the invention, the electric contact, during tightening of the connection, is secured against rotating together with the screw. Here, various options for securing the electric contact against rotating together with said screw are feasible. For example, the electric contact can be radially fixed in the connector housing. As an alternative, it can be provided that the protective cap radially fixes the electric contact. As a further alternative, it is also feasible for the electric contact to be secured by a nut before tightening of the connection.

Furthermore, it is particularly advantageous when the connector, for example by way of the connector housing, latches with the electric contact.

By way of example, an electric contact can be provided with a latching groove and a connector housing can be provided with at least one spring tab, wherein the latching groove and the spring tab engage one in the other.

The above refinements and embodiments can, where appropriate, be combined with one another in any desired manner. Further possible refinements, embodiments and implementations of the invention also comprise not explicitly cited combinations of features of the invention that are described above or below in respect of the exemplary embodiments. In particular, a person skilled in the art will also add individual aspects in this case as improvements or additions to the respective basic form of the present invention.

CONTENTS OF THE DRAWING

The present invention will be explained in greater detail below using the exemplary embodiments which are shown in the diagrammatic figures of the drawing, in which.

The accompanying figures of the drawing are intended to provide a further understanding of the embodiments of the invention. They illustrate embodiments and, in conjunction with the description, serve to explain principles and concepts of the invention. Other embodiments and many of the advantages mentioned become apparent in view of the drawings. The elements shown in the drawings are not necessarily shown true to scale in relation to one another.

In the figures of the drawing, identical, functionally identical and identically acting elements, features and components are respectively provided with the same reference symbols—unless stated otherwise.

The figures are described below in a coherent and comprehensive manner.

DESCRIPTION OF EXEMPLARY EMBODIMENTS

Figure 1:
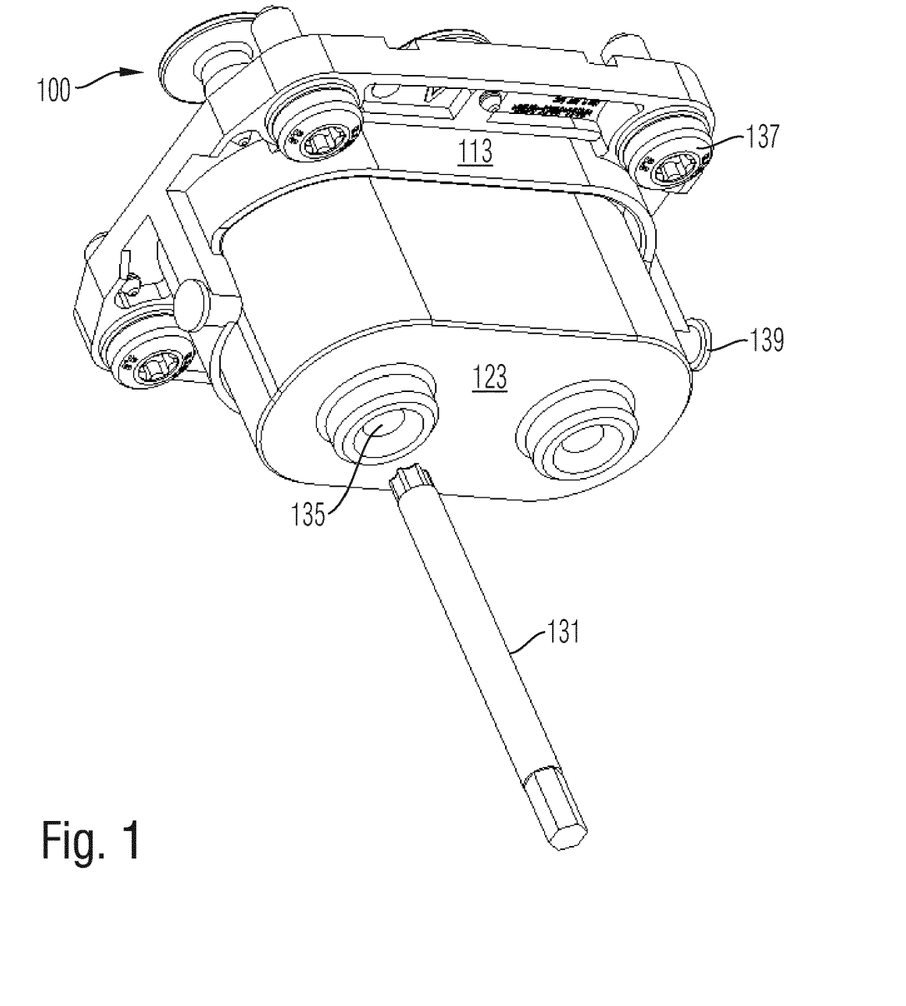
FIG. 1 shows a perspective view of a connector according to an embodiment of the invention and also a tool.

FIG. 1 shows a perspective view of a connector 100 according to the invention and also a tool 131. The tool 131 is in the form of a Torx key.

The connector 100 has an assembly 115 comprising a screw 105 according to an embodiment of the invention, an electrical conductor 101 and an electric contact 103 (not illustrated in FIG. 1), a connector housing 113 and a protective cap 123.

FIG. 1 shows the connector 100 during the assembly process. Accordingly, the preassembled assembly 115 is located in the connector housing 113. In order to completely assemble the assembly 115 or the connector 100, the screw is tightened using the tool 131. In order to protect the connector 100, particularly the surface of said connector, against being scratched by the tool, the protective cap 123 has been fitted onto the connector housing 113. Provision can be made to remove the protective cap 123 after assembly is complete or to leave said protective cap on the connector housing 113 in order to continue to protect the connector 100. The protective cap 123 has two openings 135 in order to ensure the accessibility for the tool 131 into the interior of the connector 100.

FIG. 1 and also the following figures each show a two-pole connector. However, it is clear to a person skilled in the art that a single-pole connector or connectors having any desired number of poles are equally included in the invention.

Figure 2:
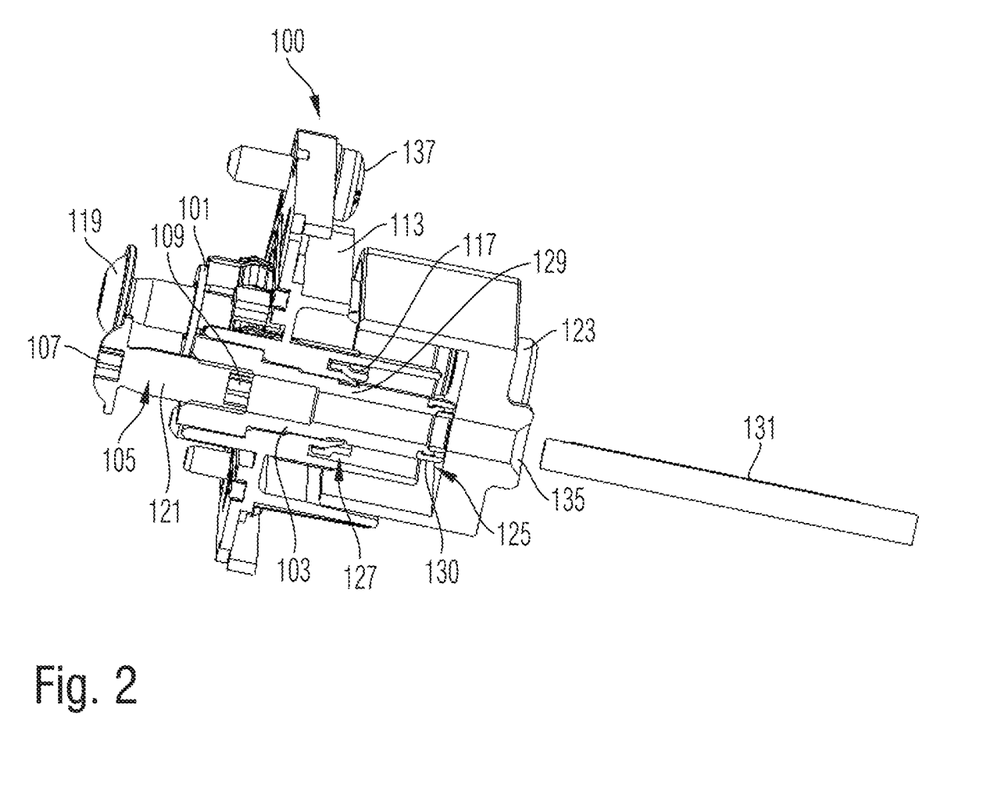
FIG. 2 shows a diagrammatic sectional view of a connector according to an embodiment of the invention during the assembly process.

FIG. 2 shows a connector 100 according to an embodiment of the invention during the assembly process, more precisely before the connection is tightened.

FIG. 2 shows the connector 100 comprising the connector housing 113 and the assembly 115. The assembly 115 comprises an electrical conductor 101 which is in the form of a busbar in FIG. 2, a screw 105 and also an electric contact 103.

The screw 105 comprises a screw head 119 having a first drive 107 and also a screw foot 121 having a second drive 109. Owing to the two opposite drives 107 and 109, the screw can be tightened from two sides, wherein the direction of rotation of the tool 131 for tightening the screw 105 by way of the first drive 107 is opposite to the direction of rotation for tightening the screw by way of the second drive 109. The screw 105 is usually tightened by way of its screw head 119 by being turned to the right and by way of its screw foot 121 by being turned to the left.

The extent of the electrical conductor 101, which is held on the electric contact 103 by the screw 105, is only partially illustrated. However, on account of the weight of the electrical conductor 101 and assembly with play, a torque which acts on the screw 105 or on the electric contact 103 can be produced. The centering aid 117, which is in the form of a spring tab or spring basket which is arranged in an annular manner in FIG. 2, is provided for compensating for a possible torque of the assembled assembly 115 in the connector housing 113.

The spring tabs 117 are connected to the latching groove 129 and in this way form the latching mechanism 127. The latching mechanism 127 has the effect that the contact 103 or the assembly 115 latches in its position in the connector housing 113. In this way, the spring contact 103 can be pushed only in one direction, specifically into the connector housing 113, whereas the electric contact 103 is secured against falling out of the connector housing 113. Instead of the latching groove 129, it is also possible to provide a plurality of axially offset latching grooves which are concentric in relation to one another.

Furthermore, provision can be made for the electric contact 103 to be radially latched by means of the latching mechanism 127 in such a way that the electric contact is secured against rotation, in particular during tightening of the connection.

As an alternative, the electric contact can also be secured against rotation by the engagement edge 130 which engages into the protective cap 123.

The connector 100 is designed to be assembled in a component (not illustrated). The conventional screws 137 using which the connector 100 can be fastened to the component are provided for this purpose. Provision can be made for the connector 100, after it has been screwed to a component, to no longer be accessible by way of the screw head 119 or by way of the first drive 107 of the screw 105. For this reason, the present invention makes provision for the connector 100 to be tightened by means of the second drive 109 of the screw 105.

Figure 3:
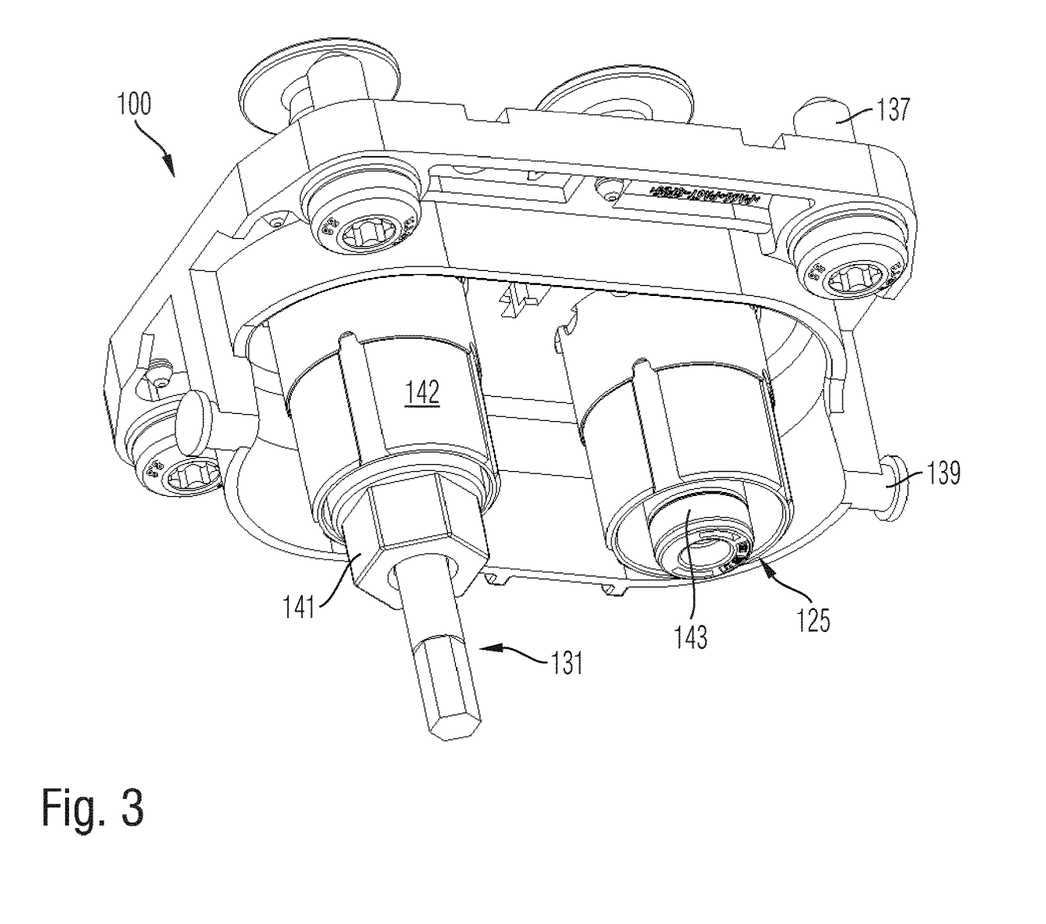
FIG. 3 shows a perspective view of a connector according to an embodiment of the invention and a tool.

FIG. 3 shows a similar connector to FIG. 1, but the connector in FIG. 3 does not comprise a protective cap. Instead, it is clear that the connector 100 is in the form of a high-voltage connector and has an electric shock protection arrangement with an electric shock protection pin 143 and a side wall 142. In addition, the electric contact 103 is secured against rotating together with the screw by the nut 141.

Figure 4:
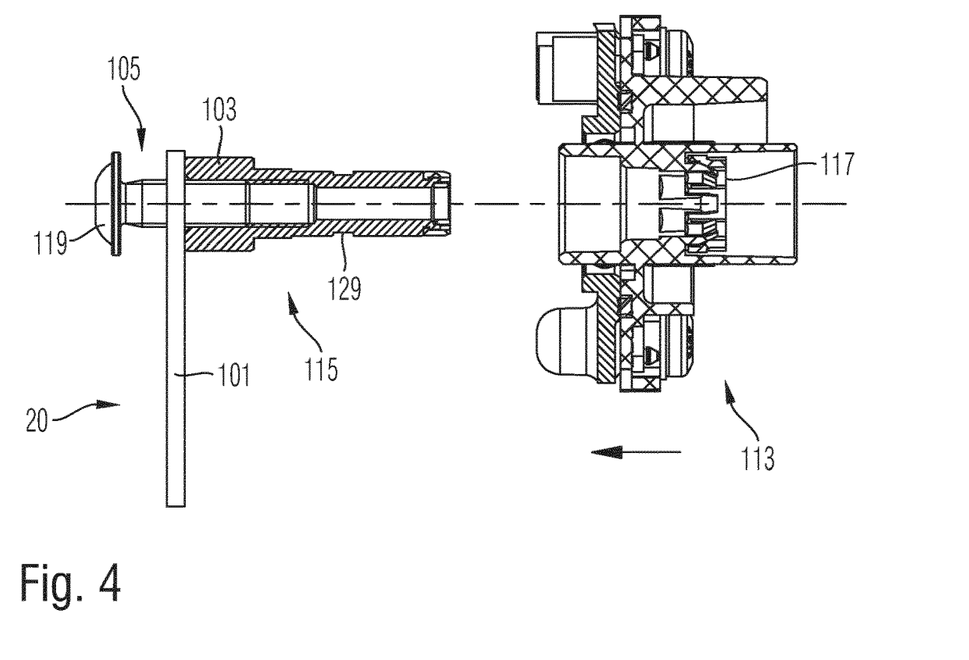
FIG. 4 shows an assembly according to an embodiment of the invention and also a connector housing according to an embodiment of the invention during assembly.
Figure 5:
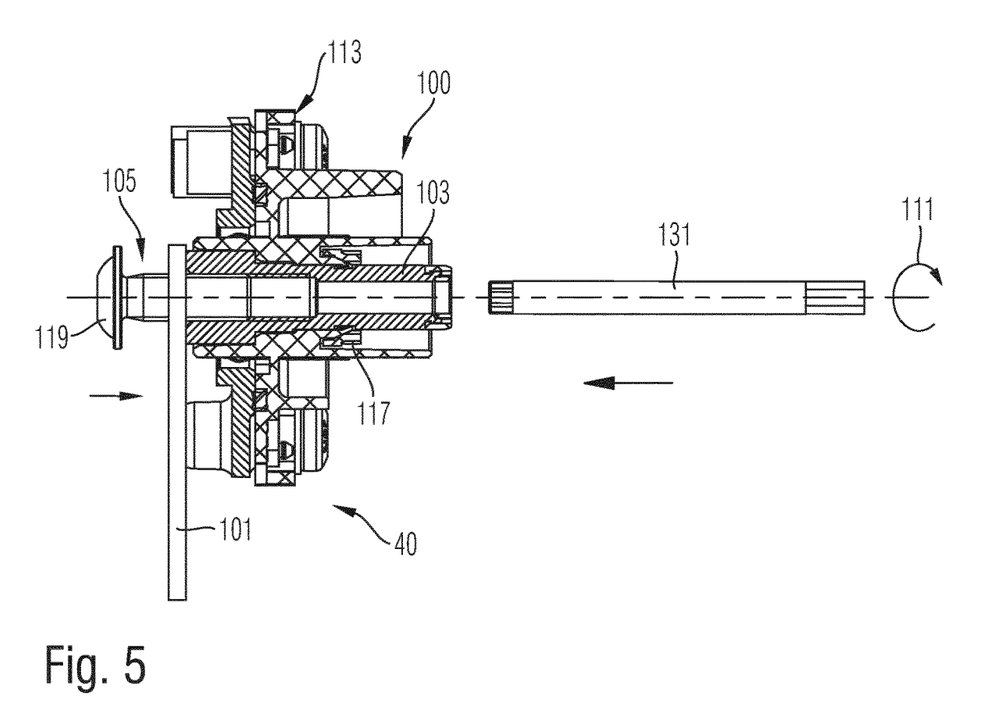
FIG. 5 shows a connector according to an embodiment of the invention and also a tool during assembly.
Figure 6:
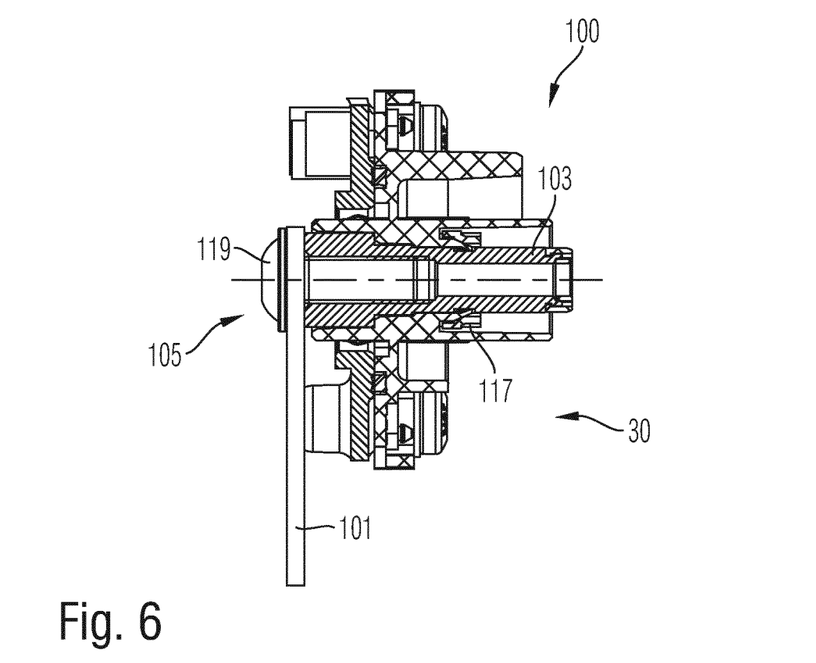
FIG. 6 shows a connector according to an embodiment of the invention after assembly is complete.

FIGS. 4-6 show individual steps of the production method according to an embodiment of the invention in a diagrammatic sectional view.

FIG. 4 shows the connector housing 113 and also, separately therefrom, the assembly 115 comprising the internal conductor 101, the electric contact 103 and the screw 105. In accordance with assembly step 20, the assembly 115 is preassembled by the electrical conductor 101, the electric contact 103 and the screw 105 being assembled with play.

FIG. 5 shows a connector 100, according to assembly step 40, in which the screw 105 and the electric contact 103 are inserted into the connector housing 113. Therefore, the electric contact 103 is latched to the spring tabs 117 in the connector housing 113. Nevertheless, there is play between the screw 105 and the internal conductor 101 since the screw 105 is not tightened.

FIG. 6 shows the connector according to an embodiment of the invention after the assembly method according to the invention is completed by step 30. In step 30, the screw 105 has been tightened by way of its second drive by the tool 131. Consequently, there is no longer play between the electrical conductor 101, the screw 105 and the electric contact 103.

Figure 7:
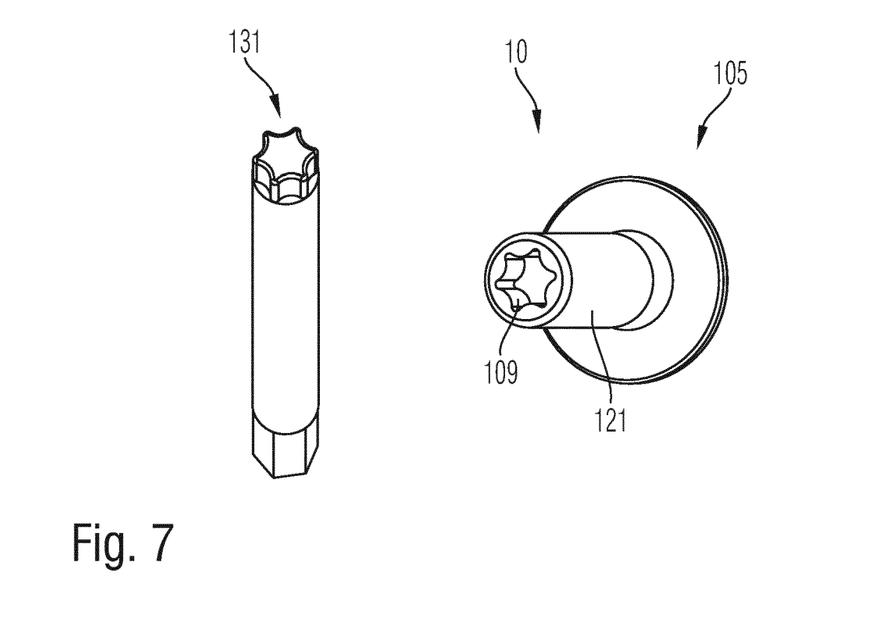
FIG. 7 shows a screw according to an embodiment of the invention and also a tool.

FIG. 7 shows a tool 131 which is in the form of a conventional Torx key. In addition, FIG. 7 shows, separately from the tool 131, the screw 105, or the assembly step 10 of providing a screw according to the invention having two drives 107, 109. The screw 105 is shown from its bottom side in FIG. 7, so that the second drive 109 in the screw foot 121 is shown.

Although the present invention has been described entirely on the basis of preferred exemplary embodiments above, it is not limited to these, but rather may be modified in a variety of ways.

LIST OF REFERENCE SYMBOLS

10 Providing a screw
20 Establishing a connection with play
30 Tightening the connection
40 Insertion into a connector housing
100 Connector
101 Electrical conductor
103 Electric contact
105 Screw
107 First drive
109 Second drive
111 Opposite direction
113 Connector housing
115 Assembly
117 Centering aid
119 Screw head
121 Screw foot
123 Protective cap
125 Socket
127 Latching mechanism
129 Latching groove
130 Engagement edge
131 Tool
135 Opening
137 Conventional screw
139 Coding
141 Nut
142 Wall
143 Electric shock protection pin

The invention claimed is:

1. An electrical connector, comprising:
a first contact comprising an opening;
a second contact comprising a through-hole; and
a screw comprising a head portion and an end portion opposite said head portion, wherein
said screw extends through said opening into said through-hole,
said head portion effects a compressive force onto a first surface of said first contact opposite a second surface of said first contact that abuts said second contact,
said head portion comprises a first drive structure, and
said end portion comprises a second drive structure.

2. The electrical connector of claim 1, comprising:
a housing comprising a generally tubular portion that receives and snappingly engages said second contact in a manner that inhibits removal of said second contact from said generally tubular portion and inhibits rotation of said second contact relative to said generally tubular portion.

3. The electrical connector of claim 1, wherein:
said through-hole comprises a first thread,
said screw comprises a second thread that engages said first thread.

4. The electrical connector of claim 1, wherein:
said screw extends only partially into said through-hole.

5. An electrical connector assembly method, comprising:
inserting a screw, through an opening of a first contact, into a through-hole of a second contact, rotatingly engaging said screw with a thread of said through-hole by means of a first drive structure tool engaged with a first drive structure provided in a head portion of said screw, increasing an engagement of said screw with said thread by rotating said screw by means of a second drive structure tool engaged with a second drive structure provided in an end portion of said screw opposite said head portion.

6. The method of claim 5, wherein:

said increasing an engagement of said screw comprises rotating said screw until said head portion effects a compressive force onto a first surface of said first contact opposite a second surface of said first contact that abuts said second contact.

7. The method of claim 5, comprising:

inserting said second drive structure tool into said through-hole until said second drive structure tool engages said second drive structure.

8. The method of claim 7, comprising:

snappingly engaging a housing to said second contact prior to said inserting said second drive structure tool into said through-hole, and positioning a protective cover over said housing prior to said inserting said second drive structure tool into said through-hole, wherein said inserting said second drive structure tool into said through-hole comprises inserting said second drive structure tool into said through-hole via an opening in said protective cover.

9. The method of claim 5, comprising:

snappingly engaging a generally tubular portion of a housing to said second contact, said generally tubular portion snappingly engaging said second contact in a manner that inhibits removal of said second contact from said generally tubular portion and inhibits rotation of said second contact relative to said generally tubular portion.

10. The method of claim 9, wherein:

said snappingly engaging of said generally tubular portion to said second contact is effected prior to said increasing an engagement of said screw.

11. The method of claim 9, comprising:

fastening said housing to a structure that inhibits access to said first drive structure by said first drive structure tool, wherein said fastening is effected subsequent to said rotatingly engaging said screw and prior to said increasing an engagement of said screw.

12. The method of claim 5, wherein:

said inserting is effected prior to said rotatingly engaging said screw, and said rotatingly engaging said screw is effected prior to said increasing an engagement of said screw.

13. An electrical connector, comprising:

a first contact comprising an opening;

a second contact comprising a through-hole; and a screw comprising a head portion, an end portion opposite said head portion, and an intermediate portion intermediate said head portion and said end portion, wherein said screw extends through said opening into said through-hole, said head portion effects a compressive force onto a first surface of said first contact opposite a second surface of said first contact that abuts said second contact, said head portion comprises a first drive structure, said end portion comprises a second drive structure, and said intermediate portion is devoid of a drive structure.

14. The electrical connector of claim 13, comprising:

a housing comprising a generally tubular portion that receives and snappingly engages said second contact in a manner that inhibits removal of said second contact from said generally tubular portion and inhibits rotation of said second contact relative to said generally tubular portion.

15. An electrical connector assembly method, comprising:

inserting a screw, through an opening of a first contact, into a through-hole of a second contact, rotatingly engaging said screw with a thread of said through-hole by means of a first drive structure tool engaged with a first drive structure provided in a head portion of said screw, advancing said head portion against said first contact by rotating said screw by means of a second drive structure tool engaged with a second drive structure provided in an end portion of said screw opposite said head portion.

16. The method of claim 15, wherein:

said advancing comprises rotating said screw until said head portion effects a compressive force onto a first surface of said first contact opposite a second surface of said first contact that abuts said second contact.

17. The method of claim 15, comprising:

inserting said second drive structure tool into said through-hole until said second drive structure tool engages said second drive structure.

18. The method of claim 17, comprising:

snappingly engaging a housing to said second contact prior to said inserting said second drive structure tool into said through-hole, and positioning a protective cover over said housing prior to said inserting said second drive structure tool into said through-hole, wherein said inserting said second drive structure tool into said through-hole comprises inserting said second drive structure tool into said through-hole via an opening in said protective cover.

19. The method of claim 15, comprising:

snappingly engaging a housing to said second contact, fastening said housing to a structure that inhibits access to said first drive structure by said first drive structure tool, wherein said fastening is effected subsequent to said rotatingly engaging said screw and prior to said advancing.

20. The method of claim 15, comprising:

snappingly engaging a generally tubular portion of a housing to said second contact, said generally tubular portion snappingly engaging said second contact in a manner that inhibits removal of said second contact from said generally tubular portion and inhibits rotation of said second contact relative to said generally tubular portion.

\* \* \* \* \*